Figure 1:
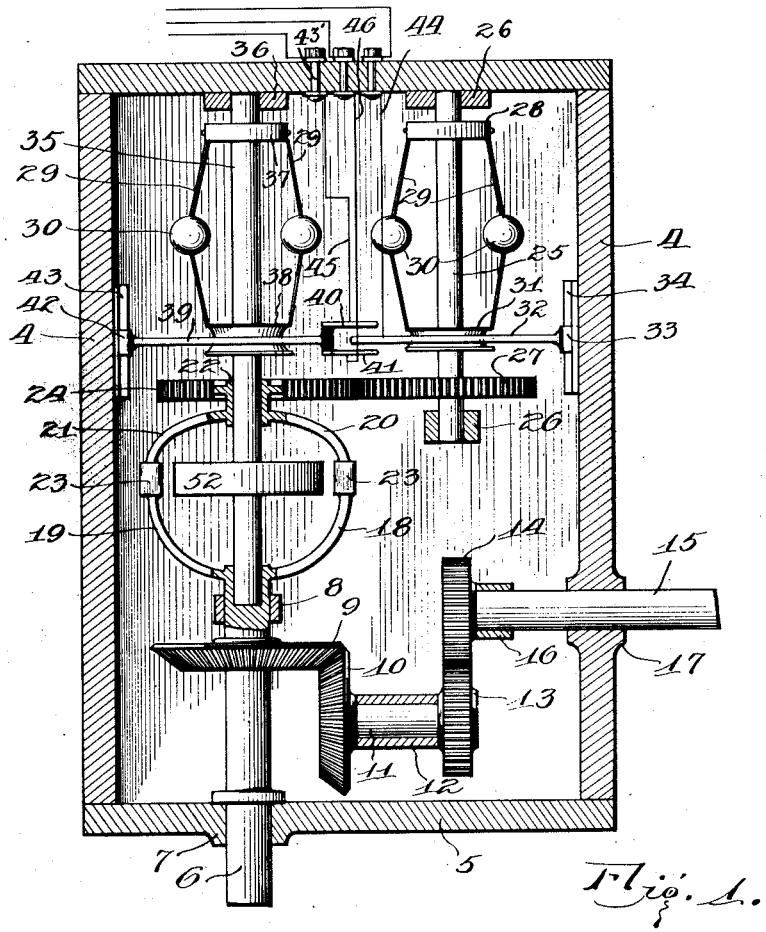

Sept. 28, 1926.  
H. M. COX  
SAFETY SIGNAL  
Filed July 25 1922

1,601,562

Inventor,
H. M. Cox.
By Gordon Stewart
Attorneys

Patented Sept. 28, 1926.

1,601,562

UNITED STATES PATENT OFFICE.

HERBERT M. COX, OF PHILADELPHIA, PENNSYLVANIA.

SAFETY SIGNAL.

Application filed July 25, 1922. Serial No. 577,368.

This invention relates to signals capable of indicating changes in the speed of a vehicle. It is frequently desirable to display a signal which will show whether the vehicle is increasing or diminishing its velocity. Such a signal has heretofore been actuated by the brake or other auxiliary mechanism of the vehicle but such arrangement is open to the objection that it is set in motion only by human agency and not directly by the action of the vehicle itself.

It is a purpose of my invention to provide a visible or analogous signal which shall be actuated directly by the change in speed of the vehicle. For example, an automobile equipped with my device will display a signal clearly indicating a decrease in speed regardless of whether this decrease in speed in caused by the slowing up of the motor, the retardation of the machine itself or the application of the brakes. Conversely, an increase in the velocity of the automobile will cause the direct display of an appropriate signal.

It is within the purport of my invention to indicate any variation from a constant or uniform speed. For example, a vehicle moving at a given speed such as fifteen miles per hour will display no signal so long as the speed remains uniform. If, however, the speed is increased or decreased, a corresponding signal will be displayed during the change in speed and as long as the change remains an increase or decrease respectively, but will again be rendered inactive as soon as the higher or lower speed becomes uniform over a considerable period of time. Thus the increase in speed from fifteen to twenty miles per hour will be indicated throughout the period of increase but the signal will become inoperative as soon as the new rate of speed, twenty miles per hour, becomes uniform over an appreciable time interval.

More specifically, my invention may be defined as an alternative signal capable of indicating both increase and decrease in vehicle velocity and actuated by change in speed of the speedometer or other driven shaft connected with the wheels of the automobile. While this result may be attained in a variety of mechanisms, I have described one preferred form and illustrated the same in the drawings in which—

Figure 2:
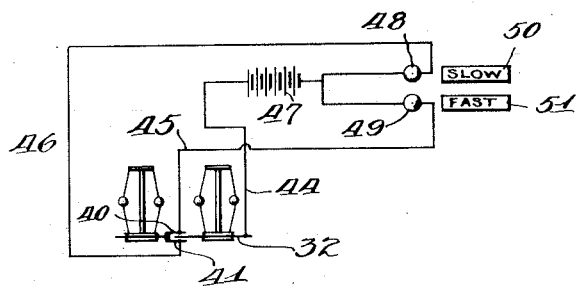

Fig. 1 shows a schematic plan view, and
Fig. 2 shows a diagram of the electrical connections of my invention.

The signal actuating means is housed within a compartment 4 having a wall 5 through which the speedometer driving shaft 6 is carried by means of bearing 7. This driving shaft 6 is connected at one end to the driving shaft of the automobile by means of a flexible cable or the like. Shaft 6 is supported in a bearing 8. A bevel gear 9 on shaft 6 meshes with a bevel gear 10 formed on shaft 11 supported on bearing 12 in the compartment 4. Shaft 11 is connected by means of gear 13 to gear 14 on shaft 15. Bearings 16 and 17 support shaft 15 in the compartment 4. The shaft 15 is operatively connected with the speedometer proper.

The end of shaft 6 carries a yoke having arms 18 and 19. The arms 18 and 19 extend radially from shaft 6 and have portions 20 and 21 respectively which are brought back to sleeve 22 coaxial with shaft 6. Permanent magnets 23 are carried by yokes 18 and 19 in opposite spaced relationship each to the other. The sleeve 22 carries a gear 24 for a purpose to be described later.

Laterally spaced from shaft 6 and parallel thereto, a governor shaft 25 is carried in bearings 26, 26. Shaft 25 has keyed thereto a gear 27 similar to gear 24 with which it is in engagement. A collar 28 is keyed on shaft 25 and carries a plurality of spring blades 29, 29 having centrifugal weights 30, 30 mounted on their middle portions. The opposite ends of the spring blades 29, 29 are held on collar 31 which is free to move axially along the shaft 25. Collar 31 has a circumferential groove which forms a bearing for a contact member 32. The contact member 32 is a recessed member surrounding collar 31 and has a bifurcated prolongation 33 which is slidable along the key 34 mounted on the inner wall of compartment 4.

The end of shaft 6 is recessed to form a bearing for one end of shaft 35, the opposite end of which is carried in bearing 36 of the compartment 4. Shaft 35 carries a collar 37 fastened thereto and having spring blades 29, 29 with centrifugal weights 30, 30 thereon. The free ends of the spring blades are carried by a collar 38 slidably movable on the shaft 35. The periphery of the collar 38 is circumferentially grooved to provide a bearing for a contact member 39 one end of which is bifurcated to form the arms 40 and 41. The opposite end of contact member 39 forms a bifurcated shoe slidable on the key 43. Key 43 is mounted upon the wall of the compartment 4, as shown.

The free end of contact member 32 is formed of conducting material and is connected to conductor 44 which may be a wire or analogous device. The bifurcated ends 40 and 41 of the contact member 39 are insulated each from the other and carry separate conducting members. The conducting member of part 40 is connected with conductor 45 while the part 41 is connected to conductor 46. Suitable binding posts 43' are mounted in one wall of the compartment 4 and are attached to conductors 44, 45 and 46.

As indicated in Fig. 2, an electric lighting circuit is thus provided which is supplied from battery 47. One pole of the battery is in circuit with conductor 44 above described. The opposite pole of the battery is connected to two parallel circuits each including a visible signal for example lamps 48 and 49 respectively and illuminated panels or transparencies 50 and 51. The illuminated panels may bear appropriate characters. As shown the panel 50 bears the word "Slow" while the panel 51 bears the word "Fast". The contact member 40 having conductor 45 is connected in circuit with lamp 49 while the opposite contact member 41 is in circuit through conductor 46 with lamp 48.

The shaft 35 carries a disk or analogous mass 52. This mass is of iron or similar paramagnetic material and is located in the plane of the magnets 23, 23. The mass 52 may also be constructed of a plurality of permanent magnets having their poles extended toward the magnets 23, 23. Under the influence of the rotating magnets 23, 23, the member 52 will be caused to rotate in the same direction and the velocity of its rotation will depend upon its own inertia and the velocity of the magnets.

It is evident that shafts 25 and 35 with their associated parts constitute speed responsive devices similar to the ordinary centrifugal governors. As shaft 6 accelerates from a position of rest it will rotate sleeve 22, gear 24, gear 27 and shaft 25. This will cause the collar 31 to rise by reason of the centrifugal action of weights 30. As a consequence the contact member 32 will rise being guided by shoe 33 along keyway 34.

During the direct driving action of shaft 6 to shaft 25, the mass of iron or permanent magnet 52 will be affected by magnets 23, 23 and will be induced to rotate at gradually increasing velocity approaching but obviously not attaining the velocity of shaft 6. The magnet 52 and shaft 35 will be prevented from attaining the speed of shaft 6 on account of their inertia and the friction at the bearings. During this gradual acceleration of shaft 35 the weights 30, 30 will cause the gradual rise of collar 38 and contact member 39. The shaft 35 will ultimately be induced to rotate at a velocity so near that of shaft 25 as to cause contact member 32 to take a position midway between the members 40 and 41.

At the beginning of the accelerating movement the sudden rise of collar 31 will bring contact member 32 against member 40 closing the circuit from 44 through 45 and lamp 49, thus displaying the signal "Fast". However, as the induced velocity of shaft 35 approaches that of shaft 25, collar 38 and contact 39 will be lifted to nearly the same extent as collar 31 or until the circuit through the contact point 40 will be broken terminating the display of the signal. This circuit will remain broken so long as the velocity of shaft 6 and consequently the vehicle remains uniform since the relation between the velocities of shafts 25 and 35 will be constant. A further increase in speed will cause a repitition of the above described movement, and the display of the signal "Fast" a second time.

In the event that the vehicle decreases its speed, the speed of the directly driven shaft 6 will likewise decrease and the direct driven governor collar 31 be lowered striking the lower contact point 41 and closing the circuit through conductor 46, lamp 48 and the visible signal 50 "Slow". During the initial decrease in speed, the momentum of magnet 52 and weights 30, 30 tends to maintain collar 38 and contact point 41 substantially stationary, subject only to the effect of friction and the drag of magnets 23. The signal 50 will therefore be maintained so long as shaft 6 is decreasing in speed at a greater rate than the decrease in speed of shaft 35.

If the decrease in speed is arrested and the vehicle maintains a lower speed which is uniform over a continued period of time then shaft 35 will slacken speed until the speed is less than that of shaft 25. The magnets 23, 23 will then be effective to induce rotation of shaft 35 at a speed slightly below that of shaft 25. The electric circuit will thus be broken and kept open until another change in speed is effected.

By reference to Fig. 2 it will be seen that for purpose of example two alternative indicating devices, lamps 48 and 49 with the respective indices "Slow" and "Fast" have been arranged to be operated by the contact members 32 and 41 dependent upon the change in relative rates of speed of the centrifugal members. It will be apparent that other indicia may be used at the option of the operator as well as variations made in the specific form of electric circuit. For example, the contact members 40 and 41 may be insulated disks on the opposite faces of collar 38, one connected by an insulated path to a stationary brush contact and the other in contact with the shaft 35 which in this case would be carried in insulated bearings. In like manner, contact member 32 may take the form of a disk electrically connected through shaft 25 to the electric circuit. Shaft 25 would likewise be provided with insulated bearings. Numerous other changes in details may be made without departing from the scope of my invention as defined in the appended claims.

What I claim is:

1. In combination with a moving element subjected to varying speeds, a speed responsive device actuated by the element, a second speed responsive device, yielding torque transmitting means for causing it to be indirectly actuated by the element, an indicating device and operating means for the indicating device rendered operative by the differential action of said speed responsive devices during variation in the speed of said element.

2. In combination with a moving element, subjected to varying speeds, a speed responsive device directly actuated by the element, a second speed responsive device, means for causing it to be inductively actuated by the element, an indicating device and mechanisms controlled by the several speed responsive devices and adapted to operate the indicating device during the occurrence of a change in speed of the element.

3. In combination with a moving element subjected to varying speeds, a speed responsive device actuated by the element, a second speed responsive device, yielding torque transmitting means causing it to be indirectly actuated by the element, an indicating device and mechanisms controlled by the several speed responsive devices and adapted to operate the indicating device during the occurrence in the increase of speed in the element.

4. In combination with a moving element subjected to varying speeds, a speed responsive device actuated by the element, a second speed responsive device, yielding torque transmitting means for indirectly actuating said second speed responsive device, an indicating device and mechanisms controlled by the several speed responsive devices and adapted to operate the indicating device during the occurrence of a decrease of speed in the element.

5. In combination with a moving element subjected to varying speeds, a speed responsive device actuated by the element, a second speed responsive device, a yielding torque transmitting means for indirectly actuating said second speed responsive device by the element, a plurality of indicating devices and mechanisms controlled by the several speed responsive devices to operate the indicating devices on variation in the speed of the element.

6. In combination with a moving element subjected to varying speeds, a speed responsive device actuated by the element, a second speed responsive device, means including a yielding torque transmitting mechanism for indirectly actuating said second speed responsive device by the element, a plurality of indicating devices and mechanisms controlled by the several speed responsive devices to operate one of the indicating devices during an increase in the speed of the element.

7. In combination with a moving element subjected to varying speeds, a speed responsive device directly actuated by the element, a second speed responsive device inductively actuated by the element, a plurality of indicating devices and mechanisms controlled by the speed responsive devices and adapted to operate the indicating devices during the occurrence of a change in the ratio between the responses of said speed responsive means.

8. In combination with normally inoperative alternative indicating devices for a moving element, a centrifugal member having a slidable collar, said member being directly actuated by the moving element, a second centrifugal member having a slidable collar yielding torque transmitting means connecting said second member with the moving element, contact members carried by said collars and electric circuits including the contact members and the indicating devices adapted to operate the latter on the occurrence of a change in relative positions of the said collars.

9. In combination with a normally inoperative indicating device for a moving element, a centrifugal member having slidable collar and being directly actuated by the moving element, a second centrifugal member having a movable collar magnetic impelling means connecting said second member with the moving element, contact members carried by said collars and electric circuit including said indicating devices and contact members and adapted to operate the indicating device on the occurrence of a change in the speed of the moving element.

10. In combination with normally inoperative alternative indicating devices for a moving element, speed responsive means directly actuated by the moving element, second speed responsive means, an inductive coupling connecting the said last named means with the moving element, a contact member carried by said first speed responsive means, a contact member carried by said second speed responsive means, said last named contact member having insulated contacts on opposite sides of said first named contact member, said contact members being electrically connected to the indicating device to display alternative indications dependent upon the contact of the single contact member with one of the contacts of the second named member.

In testimony whereof, I have hereunto affixed my signature.

HERBERT M. COX.